Oct. 13, 1964   L. E. PERKINS ETAL   3,152,644
APPARATUS FOR PRESSURING AN AUTOMATICALLY VENTING CHAMBER
Filed Sept. 15, 1961   2 Sheets-Sheet 1

INVENTORS
LEE E. PERKINS
DAVID L. FARLEY
BY
Burns, Doane, Benedict, Swecker & Mathis
ATTORNEYS INVENTORS
LEE E. PERKINS
DAVID L. FARLEY
BY Burns, Doane, Benedict, Swecker + Mathis
ATTORNEYS 3,152,644
APPARATUS FOR PRESSURING AN AUTOMATI-
CALLY VENTING CHAMBER
Lee E. Perkins, Lafayette, La., and David L. Farley, Duncan, Okla., assignors to Halliburton Company, Duncan, Okla., a corporation of Delaware
Filed Sept. 15, 1961, Ser. No. 138,333
9 Claims. (Cl. 166—165)

This invention relates to an apparatus for pressurizing an automatically venting fluid chamber. Specifically, it is concerned with such an apparatus as incorporated in an oil well formation testing tool.

Oil well testing tools previously employed have frequently included sample receiving chambers provided with automatically operable relief valves. Such relief valves have been designed to vent the sample chamber as the chamber is raised in the well bore so as to reduce the chamber pressure in response to a reduction in well bore pressure external to the testing tool. This arrangement is essentially a safety feature designed to prevent the necessity of handling a high pressure sample after it has been withdrawn from the well bore.

Prior to conducting formation tests, it may be desirable to pressure test the tool or to pump fluid to the formation to be tested. Either operation requires the introduction of pressurized fluid into the tool which would act to pressurize the sample receiving chamber. Where the tool is to be pressure tested, pump pressurized fluid, frequently water, is transmitted from the well head down through the testing string and through previously opened tool valves into the sample receiving chamber. Where formation pressures are to be offset through the use of a standing fluid column action on the formation, such as a water column, or where, for some other purpose, pressurized fluids are to be transmitted to a formation immediately prior to a formation test, such fluids must pass through the testing tool spring and through the tool to arrive at a formation. In passing through the tool, such fluids, through pump imposed pressure, act to pressurize the sample receiving chamber of the tool.

It will be readily apparent that where a tool is provided with an automatically venting sample chamber, considerable difficulty would be encountered in conducting any operation prior to performing a test which would pressurize the sample receiving chamber. In response to such imposed pressures, the chamber would tend to automatically vent so as to make tool pressure testing impossible or introduce a serious loss of formation treating fluid through chamber venting. As a result, it has heretofore not been feasible to pressure test automatically venting sample chambers or to place a fluid load on a formation without effecting the undesired automatic opening of the sample chamber.

Recognizing the need for a more versatile testing tool, it is an object of this invention to provide an automatically venting fluid chamber which may be selectively pressurized from an external source of pressurized fluid without effecting automatic venting. In particular, it is an object of the invention to provide an oil well testing tool having a self-venting fluid sample receiving chamber capable of being pressurized from a well head without the opening of the chamber vent.

It is a further object to provide such a tool which is reliable in operation, easy to fabricate and maintain, and which may readily be adapted to existing well testing tools.

It is a final object of the invention to provide such a tool in which the conventional automatic chamber venting mechanism may be disabled without interfering with subsequent normal tool operation.

In general terms, the apparatus envisioned for accomplishing the foregoing objectives comprises a chamber housing, automatically operable relief valve means in the housing for venting the chamber, conduit means communicating with the chamber for supplying pressurized fluid thereto from an external source, and means responsive to this pressurized fluid for maintaining the relief valve means closed to prevent chamber venting. In the preferred and specifically disclosed embodiment, the apparatus constitutes an improvement of a conventional oil well testing tool adapted to be supported on a conduit string within a well bore and having a sample receiving chamber including an automatic venting valve for relieving internal chamber pressure. The improvement comprises means for pressurizing the chamber from a well head source of pressurized fluid and means responsive to this pressurizing means for maintaining the chamber venting valve closing during its pressurization from the well head source.

In describing the invention, reference will be made to the accompanying drawings, in which.

As is well recognized in the oil well testing art, a conventional formation testing tool is supported on the end of a conduit string and lowered on this string to the vicinity of a zone whose productivity is to be tested. As illustrated, for example, on page 254 of the text, Petroleum Engineering by Carl Gatlin, published in 1960 by Prentice-Hall, Inc., of Inglewood Cliffs, New Jersey, such a tool typically includes as basic components, in successively downwardly spaced relationship, an upper valve assembly, a sample receiving chamber, a lower valve assembly, a packer, and a perforate conduit section communicating with the formation to be tested. After such a tool has been lowered to position the packer above the formation to be tested, the packer is set to segregate the zone to be tested from the remainder of the upper well bore. While conducting a conventional test, a valve in the assembly above the sample receiving chamber is manipulated to close the top of the chamber while the valve assembly at the lower chamber end is opened to permit fluid to flow into the chamber. This fluid sampling technique, because of the closed upper end of the chamber, is conventionally referred to as a closed-in pressure test.

The valve assembly above the sample receiving chamber is often referred to as a circulating and closed-in pressure valve and includes a relief valve, usually in the form of a check valve, for automatically venting the sample chamber in response to decreased well bore pressure as the tool is raised from the test site after the completion of a test. In this invention, a conventional circulating and closed-in pressure valve is modified to enable the sample chamber to be pressurized without the opening of the venting valve. The overall structure of the modified valve assembly is illustrated in FIGURES 1 and 2.

Figure 1:
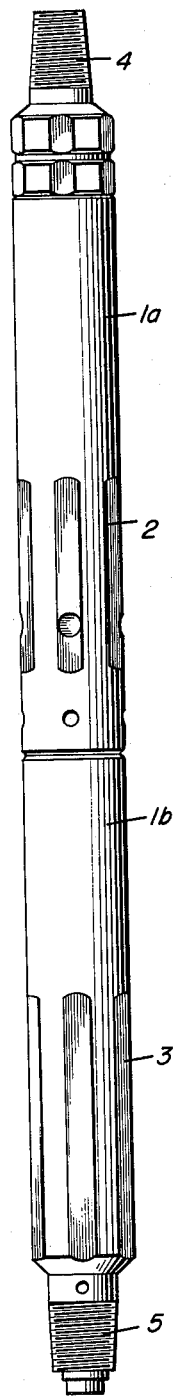
FIGURE 1 is an elevational view of the portion of a well testing tool housing a fluid chamber relief valve and the means presented through this invention for rendering this valve inoperable during chamber pressurization.

As shown in FIGURE 1, the circulating and closed-in pressure valve assembly is contained within a generally cylindrical, sectional housing including upper section 1a and lower section 1b. To facilitate tool manipulation of the sections during assembly of the tool, section 1a is provided with tool engageable surfaces 2 while section 1b is provided similarly with tool engageable surfaces 3. A threaded terminus 4 at the upper end of housing section 1a is adapted to be coupled or attached to the lower end of a tool supporting conduit string. The threaded terminus 5 at the lower end of section 1b is adapted to connect, through conventional coupling means, with a cylindrical, formation fluid sample receiving, chamber in the testing tool.

Figure 2:
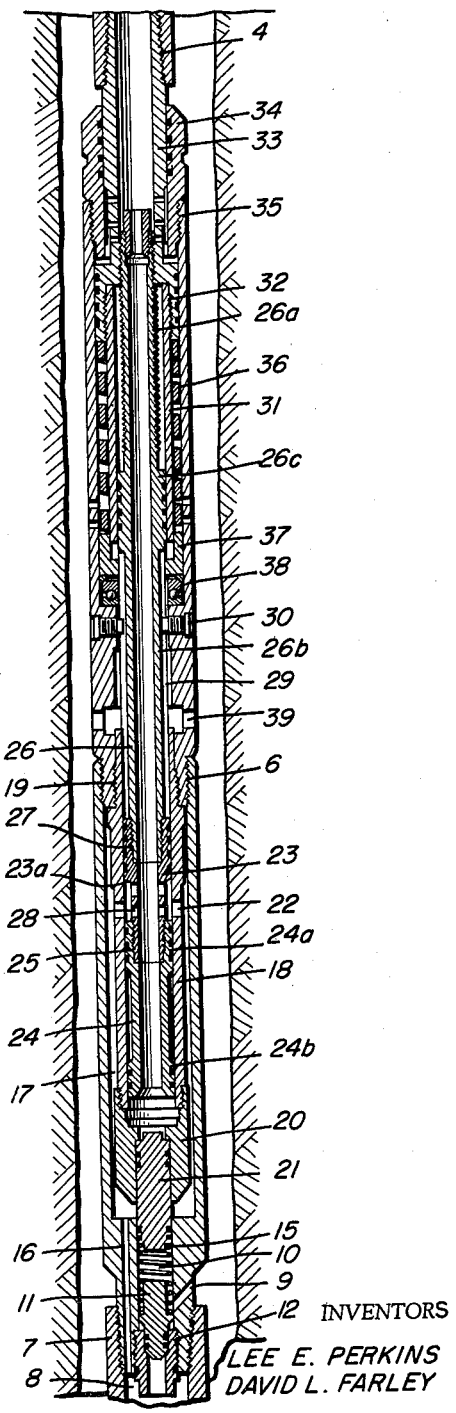
FIGURE 2 is a sectional view of the portion of the tool shown in FIGURE 1.

As shown in FIGURE 2, sections 1a and 1b are joined at threaded connection 6 to define an essentially cylindrical, integral housing assembly. Terminus 5 at the lower end of the valve assembly is connected to an internally threaded coupling 7 at the upper end of sample receiving chamber 8.

A vent passage 9 extends transversely through the wall of the lower end of housing section 1b to communicate with a central passage 10 extending axially through this end of housing section 1b. Mounted within passage 10 is a relief valve assembly including a longitudinally reciprocable, piston-type check valve 11. As illustrated in the enlarged view in FIGURE 3, check valve 11 includes an upper portion 11a of less diameter than axial passage 10, a centrally positioned, annular enlargement or flange 11b, and a valving, piston-like, lower portion 11c. Valving portion 11c of check valve 9 telescopingly extends into cylindrical seat bushing 12 and sealingly engages this bushing through O-rings 13. As illustrated, valve bushing 12 may be threadably supported within terminus 5 at threaded junction 14 and sealed to this terminus by a conventional O-ring gasket 14a. Valve 11 is engaged and arrested in its downward movement by an annular seat 12a which engages the lower end of valving portion 11c. A coil spring 15 encircles upper portion 11a of the valve 11 and engages annular shoulder 11b so as to resiliently bias the valve downwardly into engagement with seat 12a. As is apparent, when check valve 11 is biased upwardly by fluid pressure within chamber 8 to such an extent as to overcome the resilience of spring 15 and any fluid pressure acting on the upper end of the valve portion 11a within the passage 10, it will move upwardly until valving portion 11c is moved out of sealing engagement with cylindrical bushing 12. In this way there would be provided a relief passage for chamber 8 extending through the interior of bushing 12 and out vent passage 9 to the annular well bore space at the tool exterior.

Figure 4:
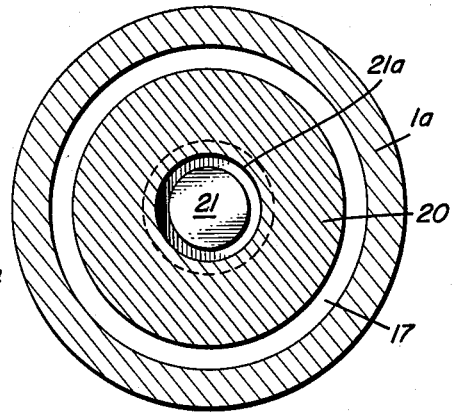
FIGURE 4 is a transverse sectional view through the tool taken along the line 4—4 of FIGURE 3.
Figure 5:
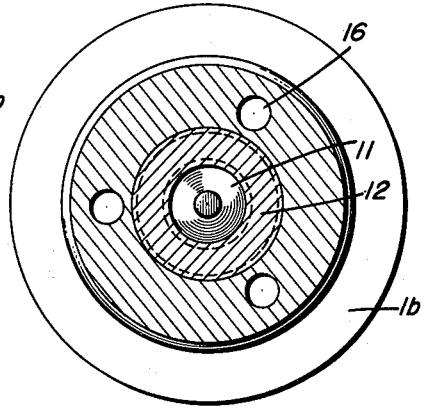
FIGURE 5 is a transverse sectional view through the tool taken along the line 5—5 of FIGURE 3.

A series of longitudinally extending passages 16 are provided in the lower end of housing section 1b to afford fluid communication between the interior of the housing and the sample receiving chamber 8. As shown in FIGURE 5, three such passages, for example, may be utilized. The upper end of these passages 16 terminate in a substantially annular cavity 17 formed between the wall of housing section 1b and a valve cylinder 18. Valve cylinder 18, as illustrated, is supported at threaded junction 19 within the lower end of housing section 1a and extends downwardly from this junction in coaxial, spaced relation with the wall of housing section 1b. Valve cylinder 18 terminates at its lower end in a cylinder cap 20 defining, in essence, a cylinder continuation. The lower end of valve cylinder 18 is closed by cylinder cap 20 and a longitudinally reciprocable piston 21 which coaxially intersects the cap in the manner set forth in FIGURES 3 and 4. Piston 21 extends from cap 20 into the end of housing section 1b above check valve 11. Piston 21, at its upper end, includes an annular shoulder 21a which engages an annular flange 20a formed in cylinder cap 20. The lower end of piston 21 is provided with an annular shoulder 21b which provides an upper seat for coil spring 15. Thus, as illustrated, coil spring 15 is effective to resiliently bias piston 21 upwardly into engagement with seat 20a of cylinder cap 20 and also bias check valve 11 downwardly into sealing engagement with bushing 12.

In the wall of valve cylinder 18 there are formed radially extending passages 22. Passages 22 provide fluid communication between annular cavity 17 and the interior of valve cylinder 18.

Slideably mounted within valve cylinder 18 is a generally cylindrical, radially ported, slide valve 23. Valve 23 is supported for axial telescoping movement within valve cylinder 18 by lower mandrel 24 engaging its lower end at a threaded junction 25 and an upper mandrel 26 engaging its upper end at a threaded junction 27. Slide valve 23, at its upper end, includes an annular enlargement 23a while lower mandrel 24, at both its upper and lower ends, is provided with similar annular enlargements 24a and 24b. These enlargements, in conjunction with the illustrated O-ring gaskets, sealingly and threadably engage the inner wall of valve cylinder 18 to provide stabilized longitudinal valve movement free from lateral distortion. Enlargements 23a and 24a isolate radial valve ports 28 from the remainder of the slide valve assembly. With the slide valve 23 positioned as shown to align the ports 28 with the valve cylinder ports 22, fluid communication is provided between the interior of the valve and the annular cavity 17.

Upper mandrel 26 extends axially into upper housing section 1a and terminates in an externally threaded upper end 26a. A mid-portion 26b is longitudinally slotted. Longitudinal slots 29 in portion 26b are engaged by the inner ends of radially extending, retaining bolts 30 to prevent rotational movement of the mandrel and valve assembly. An annular enlargement 26c intermediate threaded portion 26a and slotted portion 26b engages the inner wall of a cylindrical section 31, rigidly secured within the upper end of upper housing section 1a at threaded junction 32, so as to provide further stabilization and lateral support for the mandrel and valve assembly. Conventional O-rings mounted on the periphery of annular enlargement 26c enable this enlargement to sealingly engage cylindrical section 31.

The upper end of threaded portion 26a of upper mandrel 26 is threadably received within a female threaded portion of a control nut 33. Control nut 33, through threaded terminus 4, is fixed to a testing tool supporting conduit string. As illustrated, nut 33 is rotatably and sealingly journalled within a cap 34, which cap is secured at threaded junction 35 to the upper end of housing section 1a. Control nut 33 is urged upwardly by a heavy helical spring 36 housed between cylindrical section 31 and the outer wall of housing section 1a. The lower end of spring 36 is supported by spring seat 37 mounted on roller bearing assembly 38.

Mandrel 26 is open at its upper end so as to provide fluid communication between the interior of the mandrel and valve assembly and the interior of the testing tool supporting conduit string. Thus, fluid may pass through the string interior and into the interior of mandrel 26 to ports 28 in valve 23. When ports 28 are aligned with ports 22 in valve cylinder 18, fluid communication is provided between the interior of the conduit string and the annular cavity 17 and thus, through means of the passages 16, between the string and the sample chamber 8. Accordingly, valve cylinder 18 with its cap 20 may be considered to define a laterally valved, closed end, conduit section for conveying fluid from the conduit string to the annular passage 17 between this conduit section and a second conduit section formed by the outer wall of housing section 1b.

Under certain circumstances it is desirable to circulate fluid between the conduit string and the well bore annulus above the tool packer. For this purpose there are provided circulating ports 39 in the wall of upper housing section 1a. Ports 39 communicate with the central passage defined by upper mandrel 26 and valve 23 when the valve and mandrel assembly is moved upwardly from the illustrated position to align the ports 39 and 28.

In conventional operation of the testing tool, after the tool has been properly positioned with the packer located immediately above a formation to be tested, the packer is set to isolate this formation and to both rotatably and longitudinally secure the tool within the well bore. With the tool thus secured, the tool supporting conduit string may be rotated to effect manipulation of the tool valves including the circulating and closed-in pressure valve. By rotating the conduit string, the conduit string attached control nut 33 will be caused to rotate within the upper housing section 1a. As the tool is prevented from rotating by means of the set packer, and as the mandrel 26 is prevented from rotating by retainer bolts 30, this rotation of nut 33 will cause the mandrel and valve assembly to translate longitudinally in the tool. Thus, when a sample is to be obtained, the valve 23 may be moved upwardly to separate the ports 28 from fluid communication with the ports 22 to thus segregate the upper end of the sample chamber from the interior of the conduit string. At the completion of a test where it may be desired to circulate fluid between the annulus above the tool packer and the interior of the conduit string, the string may be further rotated to bring the circulating ports 39 into fluid communication with the ports 28 of the valve 23.

As heretofore noted, prior to initiating a test, it may be desirable to pressure test the formation fluid receiving chamber or pass pressurized fluid through the tool for transmittal to the formation. To effect such fluid transmission from the conduit string through the tool, the valve 28 is positioned as illustrated to align the ports 22 and 28. Such alignment permits fluid to flow from the interior of the conduit string, through the central passage extending through mandrel 26 and valve 23, through ports 28 and 22 into annular cavity 17, and from this cavity through passages 16 into chamber 8.

By reference to FIGURES 3, 4, and 5 the manner in which piston 21 is effective to prevent opening of relief or check valve 11 will be explained. Piston 21 is, in essence, an elongate cylindrical plug having annular shoulders at each end. Piston 21 is slideably positioned in centrally and axially extending passage 10 in the end of housing section 1b, which passage has a diameter corresponding substantially to the diameter "D" of piston 21. The bushing 12 in the lower end of passage 10 which forms a seat for relief valve 11, provides a reduction in diameter of passage 10. Thus, the upper seat portion of this bushing which slideably receives the lower, piston-like end 11c of the relief valve 11 has a diameter "d" which is less than the diameter "D" of the upper portion of passage 10 and piston 21. As valving portion 11c of relief valve 11 telescopingly fits within this diametered portion of the bushing 12, it also has a diameter corresponding substantially to "d."

Figure 3:
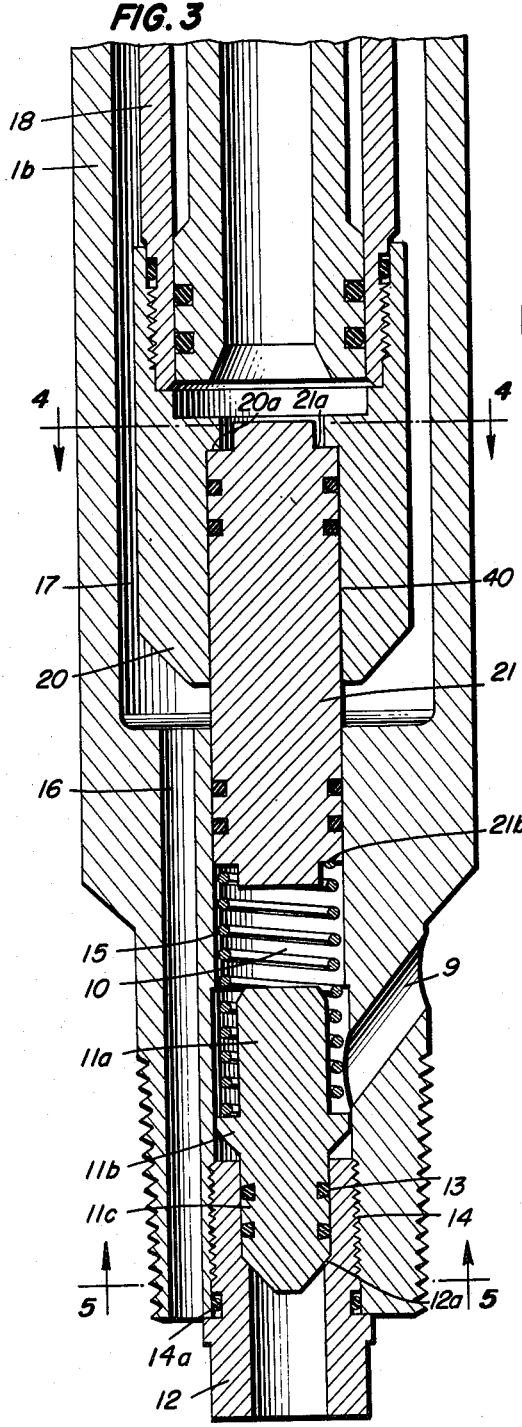
FIGURE 3 is an enlarged showing of the portion of the sectional view of FIGURE 2 in the vicinity of the relief valve and the means for rendering it inoperable.

Referring to FIGURES 2 and 3, it will be seen that the lower end of portion 11c or relief valve 11 is exposed to pressure within the formation sample chamber 8. The exposed portion of the end as well as the portion engaging seat 12a would be subject to this pressure. Thus, valve 11 would be urged upwardly by a force corresponding to the pressure within chamber 8 acting upon a piston face of diameter "d."

Piston 21 extends upwardly from passage 10 into a coaxial passage 40 of diameter "D" in the lower end of cylinder cap 20. Thus, when fluid is transmitted from the well head through the tool, it would pass through the central tool passage to act on the upper end of piston 21. As the entire upper end of piston 21, including shoulder 21a, would be subject to the fluid pressure, the force applied to this end would be equivalent to that of the fluid pressure in the passage adjacent the piston upper end acting on a face of diameter "D."

Assuming no pressure losses due to tool passages, the fluid pressure acting on the upper end of piston 21 would be substantially the same as that acting on the lower end of relief valve 11 when ports 28 and 22 are aligned to prove fluid communication between the conduit string and the sample chamber. As piston 21 presents a larger reaction face exposed to this pressurized fluid than does the relief valve 11, the downward force exerted on the piston 21 would exceed the upward force imposed upon the relief valve 11. This force differential would be of such magnitude as to cause the piston 21 to translate downwardly and engage the upper end of relief valve 11 to positively hold it in closed position so as to prevent venting of the chamber 8 through vent passage 9. In other words, the upper end portion of the piston 21, when moved downwardly in response to fluid pressure, serves to actuate i.e., induce operation or movement of, the lower end of the piston 21 so as to cause the lower piston end to engage the upper end of the relief valve 11.

In analyzing the fluid presures acting upon the piston 21 and the relief valve 11 during chamber pressurization it will be apparent that an overall downward force will act on the piston and valve corresponding to the difference between conduit string and annulus pressures and the difference in area of the exposed piston and relief valve faces. The conduit string pressure acting on the upper end of piston 21 and the lower end of valve 11 would impose a net downward force on the system in proportion to the area differential between piston faces of diameter "D" and "d." Inasmuch as the area differential of the exposed faces in the interior of passage 10 is the same as the area differential of the upper end of piston 21 and the lower end of valve 11, annulus fluid pressure acting through vent port 9 would impose a net upward force on the system corresponding to this same area differential. As the pressure of fluid in the conduit string would exceed the annulus pressure during the pressurization phase, the overall net force would be downward so as to insure the urging of valve 11 to a closed and venting preventing position.

During closed-in pressure testing, when ports 22 would be sealed from the conduit string, the pressure of the sample received within chamber 8 would act only upon the lower end of the relief valve 11. The only pressure acting upon the upper face of the piston 21 would be that of the column of fluid which might be present within the testing string. With passage 9 being open to the well bore annulus above the packed-off formation being tested, both the upper end of relief valve 11 and the lower end of piston 21 would be exposed to the fluid pressure of the fluid column which might be present in this annulus. The height of the fluid column within the tool supporting conduit string and the height of the column in the annulus would correspond to the distance between the well head and the substantially identically located passage 9 and upper end of piston 21. Normally, the conduit string would be filled with water for the purpose of placing a water cushion on the formation or pressure testing the tool. As the densitly of this water would be substantially less than the density of conventional drilling fluids which would be in the annular space outside the conduit string, the total static fluid load acting on the upper end of piston 21 would be less than the static load applied to the lower end of this piston. Thus, during the closed-in pressure test, the piston 21 would be held in its upper position, spaced from the relief valve, so as to allow this valve to operate in its normal intended manner. Even if the interior of the conduit string and the well bore annulus should be filled with fluids of the same density, or if pressures in the string and annulus should be equalized through opened ports 39, the forces acting on piston 21 would be balanced so as to render the piston inactive insofar as its effect in acting upon relief valve 11 was concerned.

At the completing of a test, as the tool was raised from the well, the annulus pressure at passage 9 would constantly diminish. When the differential in pressure between annulus pressure and the pressure in chamber 8 was sufficient to overcome the downward biasing effect of spring 15, relief valve 11 would raise to open the passage in bushing 12 and thus afford fluid communication through this passage between the interior of chamber 8 and passage 10. Fluid venting into the passage 10 would, of course, pass through the vent passage 9 to the tool exterior.

While several variations in arrangement of piston 11 might be affected, several critical criteria must be observed. It is necessary, for example, through means of a valve such as slide valve 23, that provision be made for segregating the upper end of piston 21 from the entrapped pressure of the sample received in chamber 8 during the test. Were such provision not made, this pressure, which would exceed the pressure in the annulus at passage 9, would cause downward movement of the piston 21 so as to prevent the desired venting operation of the relief valve 11. Similarly, it is necessary that sufficient space be provided between the piston 21 and the relief valve 11 to permit the valve to move to a sufficient extent to open the passage in valve bushing 12.

In describing the structure and the operation of the improved valve assembly, several substantial advantages have been made apparent. The incorporation of piston 21 provides positive means for preventing the venting of the sample chamber during well head initiated pressurization but in no way interferes with chamber venting during the normal test procedure. The coaxial disposition of the piston and relief valve facilitates fabrication and assembly of the modified tool and readily permits installation of the piston in conventional valve units presently being employed. The single moving part, i.e. the piston, for disabling the venting valve insures nominal maintenance and virtually eliminates mechanical failure. The disclosed arrangement of the piston is such as to insure that even in the event of its failure to operate during pressurization, the subsequent operation of the relief valve will not be interfered with.

The coaxial piston and valve arrangement is of further significance in that it enables the efficient utilization of a single coil spring for biasing the relief valve to a closed position and holding the piston in an upper, inoperative position. This spring, of course, in acting upon the piston 21, acts as a shock absorber to prevent damage to the piston and relief valve as these parts become engaged. It further insures restoration of the piston, at the completion of the pressurization operation, to a position spaced from the relief valve so as to insure the desired exposure of the upper end of this valve to annulus pressure.

While the apparatus of this invention has been described with reference to a particular embodiment, structural modification may occur to those skilled in the art which are well within the scope of the invention as defined in the appended claims.

We claim:

1. In an oil well testing tool adapted to be supported on a conduit string and having a fluid sample receiving chamber including an automatic venting valve for relieving internal chamber pressure, the improvement comprising: conduit means adapted to convey fluid for pressurizing said chamber from a well head source of pressurized fluid; and means including a portion exposed to said pressurized fluid and further including venting valve holding means, said portion being movable in response to fluid pressure so as to actuate said venting valve holding means to cause said venting valve holding means to engage said venting valve and hold it closed in response to the introduction of said pressurized fluid into said chamber by way of said conduit means.

2. In an oil well testing tool adapted to be supported on a conduit string and having a fluid sample receiving chamber including an automatic venting valve for relieving internal chamber pressure, which venting valve has a portion exposed to pressurized fluid within said chamber, the improvement comprising: conduit means in said conduit string for transmitting pressurized fluid from a well head source to pressurize said chamber; piston means exposed to said pressurized fluid for engaging and holding closed said chamber venting valve during said pressurizing of said chamber, said piston means having a portion exposed to said pressurized fluid, which portion has a surface area greater than that of said portion of said venting valve exposed to said pressurized fluid, said conduit means serving to conduct said pressurized fluid to said exposed portion of said piston means, and valve means in said conduit means for interrupting fluid communication between said piston means and said sample receiving chamber whereby said venting valve may open in response to pressurizing of said chamber.

3. In an oil well testing tool adapted to be supported on a conduit string and having a fluid sample receiving chamber including an automatic venting valve for relieving internal chamber pressure, which venting valve has a portion exposed to pressurized fluid within said chamber, the improvement comprising: conduit means in said conduit string for transmitting pressurized fluid from a well head source to pressurize said chamber; a piston having a portion exposed to said pressurized fluid, said portion being of sufficient area whereby said piston is moved to engage and hold closed said chamber venting valve during said pressurizing of said chamber, said conduit means serving to conduct said pressurized fluid to said exposed portion of said piston; and valve means in said conduit means for interrupting fluid communication between said piston and said sample receiving chamber whereby said venting valve may open in response to pressurizing of said chamber.

4. An apparatus for pressurizing an automatically venting chamber, said apparatus comprising: a chamber housing, relief valve means in said housing, said relief valve means being automatically operable to vent said chamber, conduit means communicating with said chamber for supplying pressurized fluid thereto from an external source, and means including a portion exposed to said pressurized fluid and further including relief valve holding means, said portion being movable in response to fluid pressure so as to actuate said relief valve holding means and cause said relief valve holding means to engage said relief valve means and hold said relief valve means closed in response to the introduction of said pressurized fluid into said chamber by way of said conduit means.

5. An apparatus for pressurizing an automatically venting chamber, said apparatus comprising: a chamber housing, relief valve means in said housing, said relief valve means being automatically operable to vent said chamber and having a portion exposed to pressurized fluid within said chamber, conduit means communicating with said chamber for supplying pressurized fluid thereto from an external source, piston means responsive to said pressurized fluid for maintaining said relief valve means closed to prevent chamber venting, said piston means having a portion exposed to said pressurized fluid, which portion has a surface area greater than that of said portion of said relief valve exposed to said pressurized fluid, said conduit means serving to conduct said pressurized fluid to said exposed portion of said piston means, and valve means in said conduit means for interrupting fluid communication between said piston means and said chamber whereby said relief valve means may open in response to pressurizing of said chamber.

6. An apparatus for pressurizing an automatically venting chamber, said apparatus comprising: a chamber housing, relief valve means in said housing, said relief valve means being automatically operable to vent said chamber and having a portion exposed to pressurized fluid within said chamber, conduit means communicating with said chamber for supplying pressurized fluid thereto from an external source, a piston having a portion exposed to said pressurized fluid, said portion being of sufficient area whereby said piston is moved to engage and hold closed said relief valve means to prevent chamber venting, said conduit means serving to conduct said pressurized fluid to said exposed portion of said piston, and valve means in said conduit means for interrupting fluid communication between said piston and said chamber whereby said relief valve means may open in response to pressurizing of said chamber.

7. An apparatus for pressurizing and automatically venting a fluid sample chamber of an oil well testing tool, said apparatus comprising: a chamber housing having a cylindrical side wall; relief valve means at the upper end of said housing for venting said chamber, said relief valve means including a spring biased, downwardly seating, piston-type check valve having a lower portion exposed to the interior of said chamber; conduit means communicating with said chamber for supplying pressurized fluid thereto from a well head source; a piston having an upper portion exposed to said pressurized fluid, said upper portion having a larger area than that of the lower portion of said check valve exposed to said chamber interior whereby said piston will move downward in response to said pressurized fluid to engage and hold closed said relief valve means to prevent chamber venting, said conduit means conducting said pressurized fluid to said upper portions of said piston, and valve means in said conduit means for interrupting fluid communication between said piston and said chamber whereby said check valve may open in response to pressurizing of said chamber.

8. An apparatus for pressurizing and automatically venting a fluid sample chamber of an oil well testing tool, said apparatus comprising: a chamber housing having a cylindrical side wall; relief valve means at the upper end of said housing for venting said chamber, said relief valve means including a spring biased, downwardly seating, piston-type check valve having a lower face exposed to the interior of said chamber; conduit means communicating with said chamber for supplying pressurized fluid thereto from a well head source, said conduit means including a first conduit section communicating with said well head source and having a closed lower end above said check valve, and a second conduit section encircling and spaced from said first conduit section to provide an annular passage communicating with said chamber, said conduit means further including valve means for providing selective fluid communication between the interior of said first conduit section and said annular passage; and a piston reciprocably mounted in the closed lower end of said first conduit section and downwardly slideable into engagement with said check valve, said piston having an upper face exposed to said pressurized fluid within said first conduit section and of larger area than that of the lower face of said check valve exposed to said chamber interior and whereby, said valve means opened to admit pressurized fluid to said chamber, said piston will move downwardly in response to said pressurized fluid to engage and hold closed said check valve to prevent chamber venting.

9. An apparatus for pressurizing and automatically venting a fluid sample chamber of an oil well testing tool, said apparatus comprising: a chamber housing having a cylindrical side wall; relief valve means at the upper end of said housing for venting said chamber, said relief valve means including a downwardly seating, piston-type check valve having a lower face exposed to the interior of said chamber; conduit means communicating with said chamber for supplying pressurized fluid thereto from a well head source, said conduit means including a first conduit section communicating with said well head source and having a closed lower end above said check valve, and a second conduit section encircling and spaced from said first conduit section to provide an annular passage communicating with said chamber, said conduit means further including valve means for providing selective fluid communication between the interior of said first conduit section and said annular passage; a piston reciprocably mounted in the closed lower end of said first conduit section, coaxial with said check valve, and downwardly slideable into engagement therewith; a coil spring between said piston and said check valve urging said check valve to a closed position and urging said piston into spaced relation with said valve; and passage means providing fluid communication between said tool exterior and the facing ends of said piston and check valve; said piston having an upper face exposed to said pressurized fluid within said first conduit section and of larger area than that of the lower face of said check valve exposed to said chamber interior, whereby, with said valve means opened to admit pressurized fluid to said chamber, said piston will move downwardly in response to said pressurized fluid to engage and hold closed said check valve to prevent chamber venting.

References Cited in the file of this patent

UNITED STATES PATENTS

| | | |
|---|---|---|
| 1,749,928 | Stephenson | Mar. 11, 1930 |
| 2,674,313 | Chambers | Apr. 6, 1954 |
| 2,740,479 | Schwegman | Apr. 3, 1956 |
| 2,913,053 | Westbrook | Nov. 17, 1959 |

UNITED STATES PATENT OFFICE
CERTIFICATE OF CORRECTION

Patent No. 3,152,644                     October 13, 1964

Lee E. Perkins et al.

It is hereby certified that error appears in the above numbered patent requiring correction and that the said Letters Patent should read as corrected below.

Column 10, line 5, after "whereby," insert -- with --.

Signed and sealed this 26th day of January 1965.

(SEAL)
Attest:

ERNEST W. SWIDER
Attesting Officer

EDWARD J. BRENNER
Commissioner of Patents